G. W. TROGNER.
NAIL OR SPIKE PULLER.
APPLICATION FILED SEPT. 30, 1907.
949,337.
Patented Feb. 15, 1910.
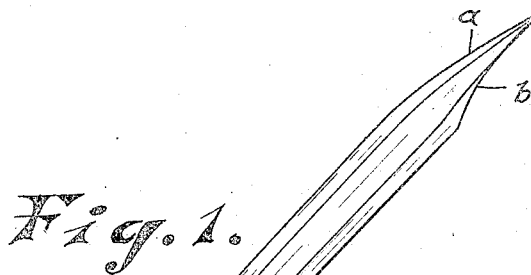
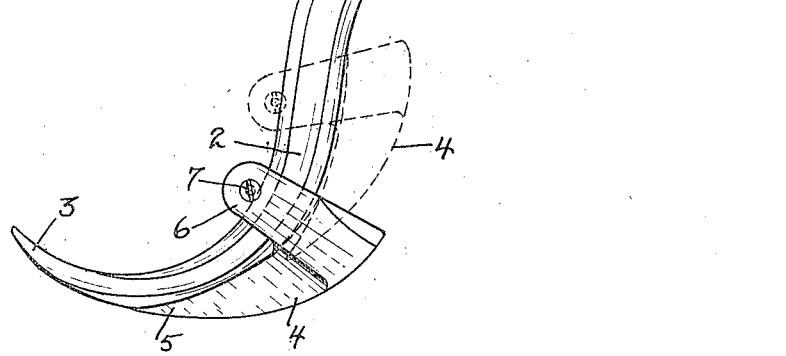
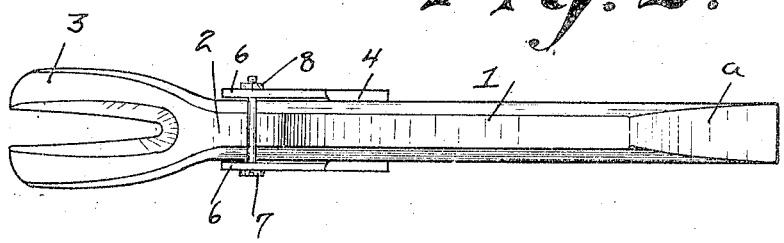
WITNESSES:
O. R. Erwin
A. A. Schultz
INVENTOR
George W. Trogner
By Erwin & Wheeler
ATTORNEYS.

UNITED STATES PATENT OFFICE.

GEORGE W. TROGNER, OF NEILLSVILLE, WISCONSIN, ASSIGNOR TO EMERY BRULEY, OF NEILLSVILLE, WISCONSIN.

NAIL OR SPIKE PULLER.

949,337.  Specification of Letters Patent.  Patented Feb. 15, 1910.

Application filed September 30, 1907. Serial No. 395,074.

*To all whom it may concern:*

Be it known that I, GEORGE W. TROGNER, a citizen of the United States, residing at Neillsville, county of Clark, and State of Wisconsin, have invented new and useful Improvements in Nail or Spike Pullers, of which the following is a specification.

My invention relates to improvements in nail or spike pullers.

The object of my invention is to provide a tool of this class with an adjustable rocker bearing member which can be readily moved into and out of the position of use to raise or lower the fulcrum bearing point. Also to improve the form of the tool and bearing member.

In the following description reference is had to the accompanying drawings, in which, Figure 1 is a side view of a tool embodying my invention. Fig. 2 is a plan view of the same.

Like parts are identified by the same reference characters in both views.

A handle bar 1 has a portion 2 curved downwardly and then upwardly with reference to the axis of the bar, preferably in the arc of a circle and the extremity is provided with an ordinary claw 3 to engage the head of the nail or spike. A bearing shoe 4 has the lower surface curved segmentally and an upper surface conforming generally to the contour of the underside of the portion 2, the upper and lower surfaces converging to the end 5 nearest the claw. Near the rear end of the shoe, arms 6 extend upwardly on each side of the portion 2 of the bar and are connected above the portion 2 by a bolt 7 and nut 8, by means of which the arms 6 may be clamped against the portion 2 and made to bind with any desired degree of rigidity. These arms are preferably formed integrally with the shoe 4, the material being sufficiently resilient to yield when the nut is tightened. It is not necessary, however, to clamp the shoe rigidly in position, and the arms will preferably be caused to bind only with sufficient force to resist a change in adjustment by gravity or by a light pressure.

In use, when the head of the nail or spike projects but slightly, the shoe 4 may be pushed upwardly along the handle as shown in dotted lines. Where the head occupies a raised position, however, the shoe 4 is adjusted to position of use as shown in full lines, thus furnishing a fulcrum bearing close to the nail although the claw is then in a raised position.

The outer or upper end of the bar 1 is preferably tapered or wedge shaped to engage under the head and start the nail or spike. The tapered portion is preferably made slightly convex on one side as shown at *a* and concave on the other side as shown at *b*, the extremity of this side being substantially parallel to the axis.

Having thus described my invention what I claim as new and desire to secure by Letters Patent is,

A tool of the described class, comprising a handle bar having one end curved downwardly and then forwardly and upwardly, with substantially uniform curvature, to a tapered and forked extremity, and a bearing member adjustably secured to the under surface of the curved portion, said bearing member being in the form of a curved wedge with its thin edge extending in the direction of said forked extremity and its inner surface conforming substantially to the curvature of the claw end of the bar, the outer surface of said member being of greater curvature but adapted, in any position, of adjustment, to form with the forked extremity a substantially continuous rocker fulcrum bearing, a set of clamping arms projecting from the rear end of the bearing member and straddling said bar, and a clamping bolt connecting said arms on the concave side of the bar, substantially as described.

In testimony whereof I affix my signature in the presence of two witnesses.

GEORGE W. TROGNER.

Witnesses:
JOSEPH MORLEY,
CARL STANGE.